United States Patent
Nitzan et al.

(10) Patent No.: US 10,984,662 B2
(45) Date of Patent: Apr. 20, 2021

(54) RUNWAY ACTIVITY MONITORING, LOGGING AND ANALYSIS FOR AIRCRAFT TOUCHDOWN DETECTION AND ABNORMAL BEHAVIOR ALERTING

(71) Applicant: X—Sight Systems Ltd., Rosh HaAyin (IL)

(72) Inventors: Alon Nitzan, Rosh HaAyin (IL); Aviv Goner, Kibbutz NaAn (IL); Shlomit Teshuva-Winkler, Mevaseret Zion (IL)

(73) Assignee: X—Sight Systems Ltd., Rush HaAyin (IL)

( * ) Notice: Subject to any disclaimer, the term of this patent is extended or adjusted under 35 U.S.C. 154(b) by 378 days.

(21) Appl. No.: 15/821,773

(22) Filed: Nov. 23, 2017

(65) Prior Publication Data
US 2018/0144646 A1   May 24, 2018

Related U.S. Application Data

(60) Provisional application No. 62/426,254, filed on Nov. 24, 2016.

(51) Int. Cl.
| | |
|---|---|
| *G06F 17/00* | (2019.01) |
| *G08G 5/00* | (2006.01) |
| *B64D 45/00* | (2006.01) |
| *G08G 5/02* | (2006.01) |
| *G01S 13/91* | (2006.01) |

(52) U.S. Cl.
CPC ........... *G08G 5/0082* (2013.01); *B64D 45/00* (2013.01); *G06F 17/00* (2013.01); *G08G 5/0026* (2013.01); *G08G 5/025* (2013.01); *G01S 2013/916* (2013.01)

(58) Field of Classification Search
CPC .... G08G 5/0082; G08G 5/0026; G08G 5/025; G06F 17/00; B64D 45/00; G01S 2013/916
USPC .......................................................... 701/16
See application file for complete search history.

(56) References Cited

U.S. PATENT DOCUMENTS

| | | | | |
|---|---|---|---|---|
| 3,196,232 A | * | 7/1965 | Lisuzzo | H01H 51/281 335/154 |
| 3,261,017 A | * | 7/1966 | Luftig | G01S 1/02 342/465 |
| 5,519,618 A | * | 5/1996 | Kastner | G08G 5/0026 701/120 |

(Continued)

FOREIGN PATENT DOCUMENTS

| | | | | |
|---|---|---|---|---|
| EP | 0613111 A1 | * | 8/1994 | ........... G08G 5/0026 |

*Primary Examiner* — Ronnie M Mancho

(57) ABSTRACT

A system of automatically documenting a plurality of aircraft touchdown events detected by analyzing sensory data received from a plurality of sensors, comprising one or more interfaces for connecting to a plurality of sensors deployed to monitor at least part of a runway in an airport, the sensors comprising one or more image sensors, audio sensors and/or vibration sensors, and one or more processors coupled to the one or more interfaces. The processor(s) is adapted to receive sensory data from said plurality of sensors, the sensory data comprising image data, audio data and/or vibration data, identify a timing and a location of a landing touchdown event of an aircraft on the runway by analyzing the sensory data and classify the landing touchdown event as a normal landing touchdown event or an abnormal landing touchdown event based on the analysis.

7 Claims, 8 Drawing Sheets

(56) References Cited

U.S. PATENT DOCUMENTS

| | | | | |
|---|---|---|---|---|
| 5,831,570 | A * | 11/1998 | Ammar | G01S 13/4427 342/26 B |
| 6,462,697 | B1 * | 10/2002 | Klamer | B64F 1/36 340/933 |
| 7,280,696 | B2 * | 10/2007 | Zakrzewski | G06K 9/00771 382/218 |
| 7,908,079 | B1 * | 3/2011 | Dabney | G08G 5/065 701/120 |
| 8,706,325 | B2 * | 4/2014 | Friedlander | G08G 5/025 701/16 |
| 8,825,365 | B2 * | 9/2014 | Pepitone | G08G 5/0008 701/301 |
| 10,220,960 | B1 * | 3/2019 | Tiana | H04N 5/2353 |
| 2002/0093433 | A1 * | 7/2002 | Kapadia | B64F 1/002 340/945 |
| 2004/0080433 | A1 * | 4/2004 | Nitzan | G08G 5/065 340/945 |
| 2009/0021397 | A1 * | 1/2009 | Wipf | G08G 5/0013 340/945 |
| 2009/0243881 | A1 * | 10/2009 | Alon | G08G 5/0026 340/905 |
| 2010/0309310 | A1 * | 12/2010 | Albright | G08G 5/0082 348/135 |
| 2015/0142388 | A1 * | 5/2015 | Metzger | B60T 8/1703 702/189 |
| 2015/0262491 | A1 * | 9/2015 | Seelamonthula | H05B 45/58 340/953 |
| 2016/0320493 | A1 * | 11/2016 | Wu | G01S 19/51 |
| 2018/0366009 | A1 * | 12/2018 | Vieten | G08G 5/0026 |

* cited by examiner

RUNWAY ACTIVITY MONITORING, LOGGING AND ANALYSIS FOR AIRCRAFT TOUCHDOWN DETECTION AND ABNORMAL BEHAVIOR ALERTING

RELATED APPLICATION

This application claims the benefit of priority under 35 USC § 119(e) of U.S. Provisional Patent Application No. 62/426,254 filed on Nov. 24, 2016, the contents of which are incorporated herein by reference in their entirety.

FIELD AND BACKGROUND OF THE INVENTION

The present invention, in some embodiments thereof, relates to continuous monitoring of airport runways, logging and analyzing sensory data collected from sensors deployed along the runway and, more specifically, but not exclusively, to monitoring and analyzing the sensory data to detect potential aircraft failures and/or abnormal phenomenon and/or to identify aircraft landing touchdown events.

With the growing aircrafts traffic worldwide, the capacity of airports with respect to the volume of aircrafts take-offs and landings constantly increase. One of the ways to accommodate the growing capacity of movements is to allow more dense movements, by cutting the time between movements, which requires an accurate touchdown time and location.

With the increase in air traffic the number of avionic incidents, for example, accidents, near accidents and/or aerial incidents may also increase.

Investigating and/or analyzing these avionic incidents may allow better understanding of the root cause(s) of the avionic incidents so that measures may be taken in order to reduce the number of such avionic incidents.

Reviewing the history of avionic incidents shows that most of the avionic incidents take place during the take-off and/or landing phases of the aircraft. The avionic incidents may result from one or more of a plurality of reasons such as, for example, aircraft conditions, pilot(s) performance, traffic controller performance, weather conditions, runway conditions and/or the like.

SUMMARY OF THE INVENTION

According to a first aspect of the present invention there is provided a system for documenting a plurality of aircraft touchdown events detected by analyzing sensory data received from a plurality of sensors, comprising one or more interfaces for connecting to a plurality of sensors deployed to monitor at least part of a runway in an airport, the plurality of sensors comprising one or more image sensors, audio sensors and/or vibration sensors and one or more processors coupled to the one or more interfaces. The one or more processors are adapted to:
  Receive sensory data from the plurality of sensors. The sensory data comprising one or more of image data, audio data and/or vibration data.
  Identify a timing and a location of a landing touchdown event of an aircraft on the runway by analyzing the sensory data.
  Classify the landing touchdown event as a normal landing touchdown event or an abnormal landing touchdown event based on the analysis.
The automated real time detection of the aircraft landing touchdown event may provide an exact timing and location of the aircraft touchdown to allow for better utilization and/or increased capacity of the runway while maintaining high safety conditions by providing the reliable and exact timing and location of the aircraft touchdown.

According to a second aspect of the present invention there is provided a computer implemented method of automatically documenting a plurality of aircraft touchdown events detected by analyzing sensory data received from a plurality of sensors, comprising:
  Receiving sensory data from a plurality of sensors deployed to monitor at least part of a runway in an airport. The sensory data comprising one or more of image data, audio data and/or vibration data received from one or more image sensors, audio sensor and/or vibration sensors respectively.
  Identifying a timing and a location of a landing touchdown event of an aircraft on the runway by analyzing the sensory data.
  Classifying the landing touchdown event as a normal landing touchdown event or an abnormal landing touchdown event based on the analysis.
The automated real time detection of the aircraft landing touchdown event may provide an exact timing and location of the aircraft touchdown to allow for better utilization and/or increased capacity of the runway while maintaining high safety conditions by providing the reliable and exact timing and location of the aircraft touchdown.

According to a third aspect of the present invention there is provided a system for automatically documenting a plurality of aircraft activity events at a runway to detect hazardous conditions indicative of a potential abnormal phenomenon during one or more of the plurality of aircraft activity events, comprising one or more interfaces for connecting to a plurality of sensors deployed to monitor at least part of a runway in an airport, the plurality of sensors comprising one or more image sensors, audio sensors and/or vibration sensors and one or more processors coupled to the one or more interfaces. The one or more processors are adapted to:
  Receive sensory data from the plurality of sensors. The sensory data comprising one or more of image data, audio data and/or vibration data.
  Detect one or more hazardous condition indicative of a potential abnormal phenomenon during one or more of a plurality of aircraft activity events at the runway by analyzing the sensory data.
  Store at least part of the sensory data relating to the one or more hazardous conditions.
Detecting the hazardous condition(s) in real time may allow air traffic controllers and/or operations teams to take fast action in order to prevent the potential aircraft failure(s) (that may be indicated by the abnormal phenomenon(s)) and/or quickly respond to it.

According to a fourth aspect of the present invention there is provided a computer implemented method of automatically documenting a plurality of aircraft activity events at a runway to detect hazardous conditions indicative of a potential abnormal phenomenon during one or more of the plurality of aircraft activity events, comprising:
  Receiving sensory data from a plurality of sensors deployed to monitor at least part of a runway in an airport. The sensory data comprising one or more of image data, audio data and/or vibration data received from one or more image sensors, audio sensor and/or vibration sensors respectively.
  Detecting one or more hazardous conditions indicative of a potential abnormal phenomenon during one or more of a plurality of aircraft activity events at the runway by analyzing the sensory data.

Storing at least part of the sensory data relating to one or more hazardous condition.

Detecting the hazardous condition(s) in real time may allow air traffic controllers and/or operations teams to take fast action in order to prevent the potential aircraft failure(s) (abnormal phenomenon(s)) and/or quickly respond to it.

According to a fifth aspect of the present invention there is provided a system for powering a sensor from an electric current line of a runway lamp, comprising:

An electric current sensor located to measure an output electric current driven out of a transformer of a runway lamp. The transformer is electrically connected to an electric current line of a runway to receive a continuous input electrical current from the electric current line.

One or more of a plurality of sensors driven by a continuous electric current.

An electric current switch adapted to control feeding of the output electric current to the runway lamp.

A digital controller adapted to instruct the electric current switch to stop feeding the output electric current to the runway lamp when an output of the electric current sensor indicates that the measured output electric current is below a predefined threshold.

Wherein a feed of the sensor electric current is not affected by the instruction and the feeding of the output electric current to the runway lamp is maintained while the output electric current is above the predefined threshold.

Powering the sensors from existing power systems available at the runway, such as the lighting system allows attaching and/or distributing the plurality of sensors may significantly reduce costs, effort and/or complexity for installing the sensors by avoiding the need to deploy new and/or additional infrastructure resources (e.g. power, housing, etc.) to support the additional sensors.

According to a sixth aspect of the present invention there is provided a computer implemented method of powering a sensor with an electric current of a runway lamp, comprising:

Measuring an output electric current driven out of a transformer of a runway lamp. The transformer is electrically connected to an electric current line of a runway to receive continuously an input electric current from the electric current line.

Powering continuously one or more of a plurality of sensors using the output electric current.

Instructing an electric current switch to stop feeding the output electric current to the runway lamp when the measured electric current is below a predefined threshold.

Wherein a feed of the sensor electric current is not affected by the instruction and the feeding of the output electric current to the runway lamp is maintained while the output electric current is above the predefined threshold.

Powering the sensors from existing power systems available at the runway, such as the lighting system allows attaching and/or distributing the plurality of sensors may significantly reduce costs, effort and/or complexity for installing the sensors by avoiding the need to deploy new and/or additional infrastructure resources (e.g. power, housing, etc.) to support the additional sensors.

With reference to the first and/or second aspects of the invention, according to a first implementation, the timing is identified with an accuracy of 1 second and the location is identified with an accuracy of 10 meters. This may allow significant accuracy in determining the exact timing and/or location of the touchdown (first contact of the aircraft with the runway) during the landing event.

Optionally, with reference to the first and/or second aspects of the invention or the first implementation, according to a second implementation, the one or more processors are adapted to:

Store at least part of the sensory data relating to the landing touchdown event based on the timing.

Log the timing and the location in association with the aircraft landing touchdown event.

This may allow post event review, analysis and/or investigation of the touchdown event.

With reference to the first and/or second aspects of the invention or any of the previous implementations, according to a third implementation, the analysis comprises image processing of the image data to identify a smoke pattern next to one or more wheel of the aircraft in the image data. Identifying the landing touchdown event through the image processing allows for automated accurate detection of typical visual aspects of the touchdown.

With reference to the first and/or second aspects of the invention or any of the previous implementations, according to a fourth implementation, the analysis comprises signal processing of the audio data to identify an aircraft touchdown sound pattern in the audio data. Identifying the landing touchdown event through the signal processing of the audio data allows for automated accurate detection of typical audible aspects of the touchdown.

With reference to the first and/or second aspects of the invention or any of the previous implementations, according to a fifth implementation, the analysis comprises signal processing of the vibration data to identify a predefined pitch pattern in the vibration data. The pitch pattern is indicative of the landing touchdown event. Identifying the landing touchdown event through the image processing of the vibration data allows for automated accurate detection of typical vibration aspects of the touchdown.

Optionally, with reference to the first and/or second aspects of the invention or any of the previous implementations, according to a sixth implementation, the one or more processors are adapted to receive documentary data relating to the runway from one or more systems of the airport. The documentary data is time tagged at a time of reception and synchronized with the sensory data in a timeline sequence. Wherein each of the one or more systems is a member selected from a group consisting of: a runway lighting control system, a weather monitoring system, a runway surface monitoring system, a traffic management system and/or a foreign objects detection system. This may allow synchronizing the sensory data with the documentary data to generate a comprehensive view of the landing sequence of the aircraft. The comprehensive view may be used for post event review, analysis and/or investigation of the touchdown event.

Optionally, with reference to the first and/or second aspects of the invention or any of the previous implementations, according to a seventh implementation, the one or more processors are adapted to calculate an estimated taxiway exit the aircraft takes following the landing touchdown event to leave the runway to a taxiway. Wherein the calculation is based on at least some of: a weight of the aircraft, a speed of the aircraft while approaching the runway, a wind speed at the runway, a wind direction at the runway and/or a friction of the runway induced by one or more weather condition. This may allow informing automatically the (landing) aircraft crew which taxiway exit to take for clearing the runway in order to more rapidly clear the runway in order to increase capacity and/or utilization of the runway.

Optionally, with reference to the first and/or second aspects of the invention or any of the previous implementations, according to an eighth implementation, the one or more processors are adapted to analyze the sensory data to detect an actual taxiway exit the aircraft takes following the landing touchdown event to leave the runway to a taxiway. This may allow detecting automatically the actual taxiway exit to taken by the (landed) aircraft without human intervention.

Optionally, with reference to the first and/or second aspects of the invention or the seventh and/or eighth implementations, according to a ninth implementation, the one or more processors are adapted to generate an alert on detection of one or more discrepancy of the actual taxiway exit compared to a planned taxiway exit. This may allow rapidly informing one or more persons and/or system of the runway and/or airport of the discrepancy between the planned and actual taxiway exit the (landed) aircraft took. This may allow quickly adapting aircraft control according to the detected discrepancy in order to better utilize the runway, the taxiway and/or to prevent dangerous situations of aircraft(s) directed to the runway and/or the taxiway before cleared by another aircraft(s).

With reference to the third and/or fourth aspects of the invention, according to a tenth implementation, each of the plurality of aircraft activity events is a member selected from a group consisting of: an aircraft landing, an aircraft take-off and/or an aircraft taxi. Adapting the analysis to detect the plurality of aircraft activity events that may take place at the runway may allow responding with specific means to each of the variety of aircraft activity events detected at the runway.

With reference to the third and/or fourth aspects of the invention or the tenth implementation, according to an eleventh implementation, one or more of the hazardous conditions detected by the analysis is a member selected from a group consisting of: a contact between a body part of the aircraft and the runway, a fire in proximity to one or more engine of the aircraft, a smoke in proximity to the one or more engine, a smoke in proximity to the one or more wheel, a non-typical pattern of movement of the aircraft on the runway and/or a non-typical position or angle of the aircraft with respect to the runway. The hazardous conditions may typically indicate of the potential abnormal phenomenon.

With reference to the third and/or fourth aspects of the invention or the tenth and/or eleventh implementations, according to a twelfth implementation, the analysis comprises applying one or more classifiers on at least some of the sensory data. The one or more classifiers are trained to detect one or more of the hazardous conditions. Classification techniques may provide high functionality and accuracy for analyzing the sensory data. The classifiers may further evolve by analyzing and learning from detection of new patterns of the hazardous condition(s).

With reference to the third and/or fourth aspects of the invention or the twelfth implementation, according to a thirteenth implementation, the one or more classifiers are trained offline with a plurality of sample patterns demonstrating the one or more hazardous condition. The plurality of sample patterns includes one or more of image sample patterns, audio sample patterns and/or vibration sample patterns. Training the classifiers is essential for a valuable analysis of the sensory data. High quantity and/or diversity of the training samples may further increase the ability and/or accuracy of the classifiers to detect the hazardous condition(s).

Optionally, with reference to the third and/or fourth aspects of the invention or the tenth, eleventh, twelfth and/or thirteenth implementations, according to a fourteenth implementation, the one or more processors are adapted to generate an alert to indicate of the detection of one or more of the hazardous conditions. This may allow air traffic controllers and/or operations teams to take fast action in order to handle, respond and/or prevent the potential aircraft failure(s) that may be indicated by the abnormal phenomenon(s).

With reference to the first, second, third and/or fourth aspects of the invention or any of the previous implementations, according to a fifteenth implementation, the sensory data comprises two or more of the image data, the audio data and/or the vibration data. Analyzing two independent types of the sensory data may allow increased accuracy and/or reliability in the detection of the hazardous conditions. This may also reduce and/or prevent false positive events in which the analysis falsely detects one or more hazardous conditions during a normal aircraft activity event.

Optionally, with reference to the first, second, third and/or fourth aspects of the invention or any of the previous implementations, according to a sixteenth implementation, the one or more processors are adapted to graphically display a timeline sequence consisting of at least part of the sensory data. This may allow for simple, convenient and/or comprehensive view of the aircraft activity event during post event review, analysis and/or investigation of the aircraft activity event.

With reference to the fifth and/or sixth aspect of the invention, according to a seventeenth implementation, the continuous electric current driven to the one or more sensor is driven out of the transformer. This may allow using an existing transformer used for the runway lamp avoiding the need to deploy additional transformer(s) to power the sensors.

With reference to the fifth and/or sixth aspect of the invention or the seventeenth implementation, according to a eighteenth implementation, the continuous electric current driven to the one or more sensors is driven out of one or more other transformers electrically connected to the electric current line in parallel to the transformer. This may allow isolating the sensors power circuitry from the runway lamp circuitry in order to avoid mutual affects between elements of the lighting system(s) and the sensory system.

With reference to the fifth and/or sixth aspect of the invention or the seventeenth and/or eighteenth implementations, according to a nineteenth implementation, the electric current switch is an electronic switch. The electrical switch, for example, a solid state relay may present high longevity since it contains no moving parts.

With reference to the fifth and/or sixth aspect of the invention or the seventeenth, eighteenth and/or nineteenth implementations, according to a twentieth implementation, the electric current switch is an electro-mechanical switch. The electro-mechanical switch, for example, a solid state relay may support high current transfer to allow high current drive to the runway lamp(s).

Optionally, with reference to the fifth and/or sixth aspect of the invention or the seventeenth, eighteenth, nineteenth and/or twentieth implementations, according to a twenty first implementation, the digital controller applies hysteresis to the predefined threshold such that the instruction is not issued before the output electric current drops below a pre-defined bottom threshold level. This may reduce and/or prevent the runway lamps from intermittently turning ON and OFF while the electric current fluctuates around the pre-defined bottom threshold level.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
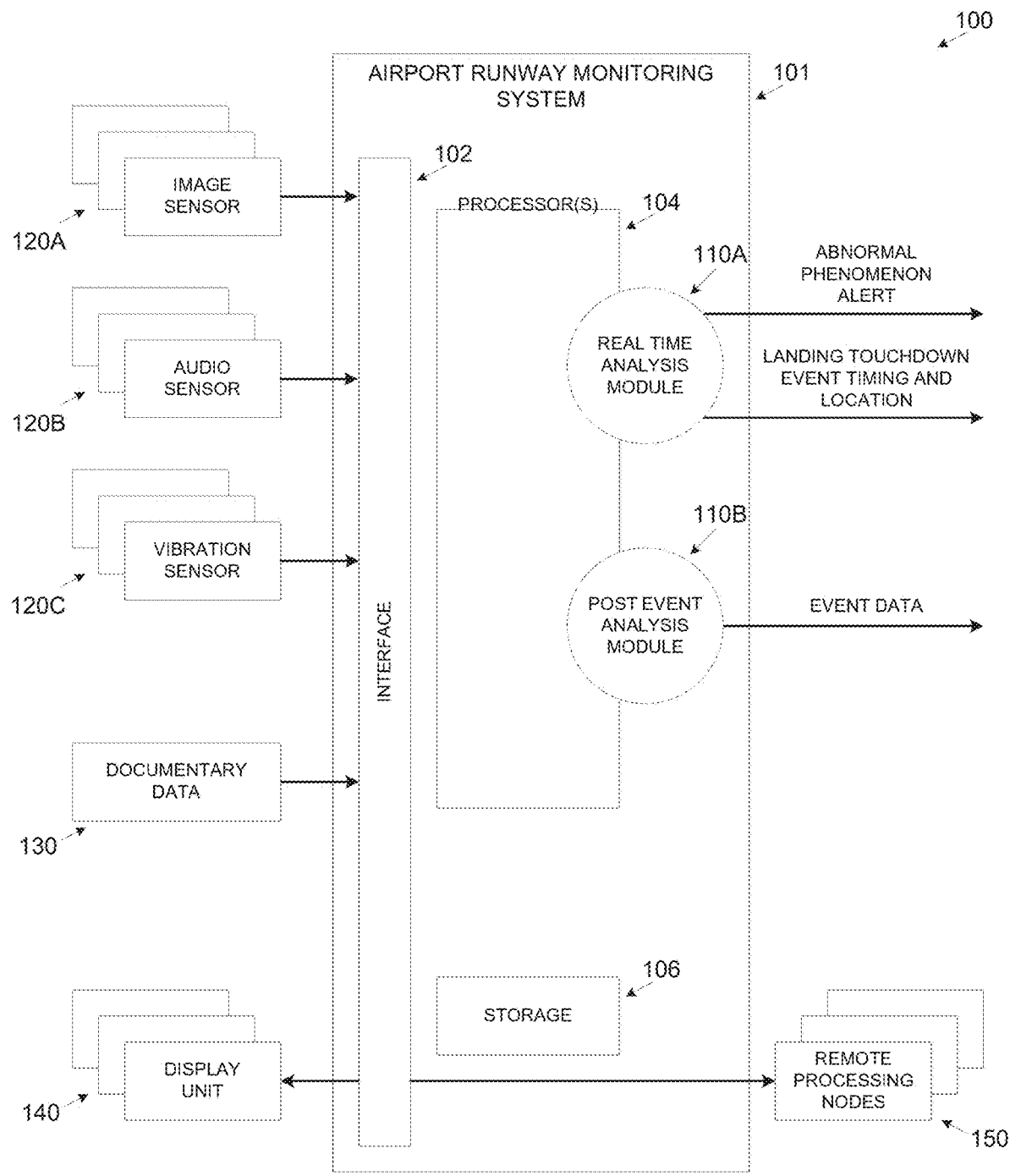
FIG. 1 is a schematic illustration of an exemplary system for automatically documenting and analyzing activity at a runway in an airport, according to some embodiments of the present invention.

The present invention, in some embodiments thereof, relates to continuous monitoring of airport runways, logging and analyzing sensory data collected from sensors deployed at the runway and, more specifically, but not exclusively, to monitoring and analyzing the sensory data to detect potential aircraft failures and/or abnormal phenomenon and/or to identify aircraft landing touchdown events.

According to some embodiments of the present invention, there are provided systems and methods for documenting and analyzing a plurality of aircraft activity events at an airport runway to provide a comprehensive, synchronized time-lined view of the chain of events, the scenario and the effecting factors of the aircraft activity event. The aircraft activity events may include, for example, aircraft landing, aircraft landing touchdown, aircraft take-off and/or aircraft taxi. The monitoring, documentation and analysis of the sensory data is directed at detecting in real time hazardous conditions that may be indicative of potential aircraft abnormal behavior and/or aircraft failures during the runway events. The monitoring, documentation and analysis of the sensory data may also be applied for identifying an exact timing and location of a landing touchdown event of an aircraft. At detection of the hazardous condition(s), the system may automatically generate an alert to indicate one or more users and/or systems, for example, a traffic control system and/or personnel, an emergency team and/or system and/or the like of the potential aircraft abnormal behavior and/or aircraft failure.

The sensory data may comprise a plurality of sensor data items collected from one or more of a plurality of sensors, for example, image sensors, audio sensors and/or vibration sensors. The collected data may be time tagged and/or arranged in a coherent sequence of events along a time axis. The analysis may be facilitated using one or more analysis methods, algorithms and/or techniques, for example, image processing, audio processing, signal processing and/or the like to analyze the collected sensory data relating to the aircraft activity events at one or more runways and/or taxiways in the airport.

Optionally, documentary data may be received from one or more sources, for example, a traffic control system, a maintenance system, a runway control/monitoring system, a foreign object damage (FOD) detection system, a weather monitoring system, a weather website and/or the like. The documentary data may comprise a plurality of documentary data items, for example, weather data, traffic status data, runway systems status, runway maintenance status, animal existence and/or FOD status. The documentary data may be integrated with the sensory data to provide a comprehensive time-lined view of the runway events before, during and following the aircraft activity event(s) at the runway. The system may analyze the documentary data together with the sensory data to improve identification of the aircraft landing touchdown timing and location and/or of the hazardous conditions during the runway event. The documentary data items may be time tagged to allow proper synchronization with the sensory data so that all data items, both the sensory data items and the documentary data items may be available to provide a precise and/or reliable time-lined view. For example, the detected aircraft landing touchdown timing and location may be correlated with planned landing events available from a planned data schedule that may be part of the documentary data.

The sensory data and/or the documentary data may be collected before, during and/or after the aircraft activity event.

The automated real time detection of the exact aircraft landing touchdown event timing and location may present some major advantages over currently available air traffic control (ATC) systems such as, for example, the Advanced Surface Movement Guidance and Control System (ASMGCS) installed in major airports for controlling both ground and airborne traffic. While the ASMGCS systems may not be capable of providing precise information of the aircraft touchdown, they may provide a two dimensional indication of the aircraft location without indicating whether the aircraft is on the ground or still in the air. The actual landing touchdown event may therefore be manually reported by the pilot or by the ATC controller based on a visual confirmation.

The automated real time detection of the aircraft landing touchdown event on the other hand provides an exact timing and location of the aircraft touchdown. This may allow for better utilization and/or increased capacity of the runway while maintaining high safety conditions by providing the reliable and exact timing and location of the aircraft touchdown. The exact timing and location of the aircraft touchdown may be used to accurately calculate and/or estimate the time of the aircraft exiting (clearing) the runway while avoiding human communication, confirmation and/or verification procedures that may currently be carried out manually. The touchdown location may further be used to direct automatically the aircraft to an appropriate taxiway exit estimated based on the exact touchdown location to reduce the exit time of the aircraft from the runway. The reduced exit time may in turn allow further increase in the utilization of the runway.

Moreover, the continuous monitoring of the sensory data may allow for real time analysis of the data during the runway event, in order to detect the hazardous conditions that may be indicative of one or more potential failures of the aircraft, for example, a potential malfunction, a potential abnormal behavior and/or the like. Detecting the hazardous condition(s) in real time and generating the alert may allow air traffic controllers and/or operations teams to take fast action in order to prevent the potential aircraft failure(s) and/or quickly respond to it.

In addition, the provided comprehensive and/or synchronized time-lined view may allow users, for example, traffic controllers, airport personnel and/or aviation investigators to follow clearly the aircraft activity event and perform a post-analysis. The post-analysis may allow the user(s) to analyze, investigate and/or identify a root cause of an avionic incident, for example, an accident, a near-accident and/or an aerial incidents in the event such an avionic incident takes place during the aircraft activity event. The system may present a wide view of the avionic incident by displaying various aspects of probable reason(s) for the avionic incident. The wide view may be available from analysis of the collected sensory data optionally coupled with the documentary data in an accurate, reliable timeline sequence to support investigation and/or analysis of the avionic incident.

The system for monitoring, documenting, analyzing and/or logging the aircraft activity events may be deployed and/or integrated with existing system and/or infrastructures already deployed in the airport runway thus reducing the deployment cost for integrating the system in the airport.

The present invention, in some embodiments thereof, provides systems and methods for powering a plurality of sensors at an airport runway using existing electrical power systems and/or infrastructures available at the runway, specifically, a runway lighting system and/or infrastructure. The constant electric current of the existing runway lighting system may be used for attaching one or more additional equipment units along the runway, for example, sensors. This setup however, may present a problem since the sensor(s) must be continuously powered while the runway lamps may be turned ON/OFF. Existing runway lamps are typically driven with electric current levels that are above a threshold level, for example, 2.8 A.

The runway lighting system may be configured such that a power system, typically comprising one or more Constant Current Regulators (CCR) of the runway lighting system drives the electric current at current levels, below the operational current range of the runway lamps (as required by the FAA). This may allow connecting one or more switching modules in series between the lamp transformer and the lamp for switching the runway lamp(s) OFF when sensing the current level below the runway lamp operational current range while the CCR still drives the electric current through the electric current line. These switching modules may include electric current sensor(s), electric current switch(s), for example, an electronic current switch and/or an electro-mechanical current switch and controller(s) for controlling the electric current switch(s). Using the electric current sensor(s), the switching modules may sense the level of the electric current driven to the runway lamp(s) by the runway lighting system. in case the electric current level is below the runway lamp(s) threshold, for example 2.8 A, the controller(s) may instruct the electric current switch(s) to stop feeding the electric current to the runway lamp(s) thus turning the runway lamp(s) OFF. Complementary when the electric current level driven by the runway lighting system is above the threshold the current switch(s) will be instructed to remain in a default state, leaving the runway lamp(s) ON and un-interfered. Optionally, hysteresis is applied by the controller(s) to the threshold, for example, OFF is set to be lower than 2.6 A while ON is set to be higher than 2.7 A. The hysteresis may be applied to avoid ON/OFF switching effects of the runway lamp(s) when the electric current level is around the threshold level. Employing the sensors powering system allows attaching and/or distributing the plurality of sensors, for example, for the system for monitoring, documenting and/or analyzing runway activity using the existing electrical power systems and/or infrastructures and avoiding the need to deploy new and/or additional infrastructure resources to support the additional sensors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention, in some embodiments thereof, provides systems and methods for automatically documenting and/or analyzing a plurality of aircraft activity events at one or more airport runways by analyzing data received from a plurality of sensors documenting the runway(s). The automatic documenting and/or analysis are directed to detecting in real time hazardous conditions that may be indicative of potential aircraft abnormal behavior and/or failures. The automatic documenting and/or analysis may be further employed to identify aircraft landing touchdown events timing and/or location.

Reference is now made to FIG. 1, which is a schematic illustration of an exemplary system for automatically documenting and analyzing activity at a runway in an airport, according to some embodiments of the present invention. A system 100 for automatically documenting and analyzing aircraft activity events, for example, an aircraft landing, an aircraft landing touchdown, an aircraft take-off and/or an aircraft taxi includes a central server 101 and one or more of a plurality of sensors 120. The sensors 120 may include, for example, image sensors 120A, audio sensors 120B, vibration sensors 120C and/or the like. The central server 101 may include an interface 102 for connecting to the sensors 120 to receive sensory data, a processor(s) 104 and a storage 106. The storage 106 may include one or more non-transitory, persistent storage devices, for example, a hard drive, a Flash array and the like. Optionally, the storage 106 includes one or more remote storage devices, for example, a remote processing node, a storage server, a network drive and/or the like.

The processor(s) 104, homogenous or heterogeneous, may be arranged for parallel processing, as clusters and/or as one or more multi core processor(s). The storage 106 may also be facilitated through one or more cloud storage services accessible by the central server 101 over one or more networks and/or the internet. The interface 102 may include one or more of a plurality of communication interfaces, links and/or ports, for example, wired interfaces and/or wireless interfaces for connecting to the sensor(s) 120. The wired interfaces may include, for example, a wide area network (WAN) interface, a local area network (LAN), a fiber optic networks, a universal serial bus (USB) interface, a small computer system interface (SCSI), a video graphics array (VGA) interface, a high-definition multimedia interface (HDMI), a serial interface, an Aeronautical Radio, Incorporated (ARINC) interface and/or the like. The wireless interfaces may include, for example, a wireless LAN (WLAN) interface, a cellular interface, a radio frequency (RF) interface and the like.

The central server 101 may execute one or more software modules, for example, a real time analysis module 110A and/or a post-event analysis module 110B. Wherein a module refers to a plurality of program instructions stored in a non-transitory medium such as the storage 106 and executed by one or more processors such as the processor(s) 104.

The image sensor(s) 120A may include, for example, a camera, a video camera, a thermal camera, an infra-red (IR) camera and the like. The audio sensor(s) 120B may include, for example, a microphone. The image sensors 120A, audio sensors 120B and/or the vibration sensors 120C may be located on, around and/or in proximity to the runway to depict at least part of the runway. The image sensors 120A, the audio sensors 120B and/or the vibration sensors 120C may connect to the central server 101 through the interface 102. The sensory data received from the sensor(s) 120 may include a plurality of sensory data items, for example, images, video clips, audio signals and/or vibration signal readings collected from the sensors 120 depicting the runway. The sensory data and/or part thereof may be stored in the storage 106.

Optionally, the central server 101 receives documentary data 130 from one or more supporting systems connected to the central server 101 through the interface 102. The supporting system(s) may include one or more local systems, for example, a general airport system and/or a system deployed at the runway. The supporting system(s) may further include one or more remote systems, for example, a website and/or a networked service.

The supporting system(s) may include, for example, a traffic control system, an airport control system and/or an airliner management system, a maintenance system, a runway control/monitoring system, a runway lighting system, a runway surface monitoring system, an FOD system, a weather monitoring system, a weather website and/or the like. The documentary data 130 may consist of one or more documentary data items, for example, light conditions, weather information, snow/ice conditions, air traffic status data, runway operational condition, runway systems status, runway maintenance status, air traffic status, animal existence, FOD status and/or the like. The documentary data 130 and/or part thereof may be stored in the storage 106.

Optionally, the documentary data may be integrated and/or synchronized with the sensory data such as the video data to provide additional information to the time-lined view of the aircraft landing sequence for analysis, storage and/or display purposes.

Optionally, the documentary data 130 includes planned aircraft landing and/or take-off scheduling log data for the monitored runway(s). The log data may be received from one or more of the local and/or the remote systems, for example, the traffic control system, the airport control system and/or the airliner management system.

Optionally, the system 100 includes one or more display units 140, for example, a monitor, a laptop computer, a workstation, a tablet, a Smartphone and/or the like. The central server 101 may be configured to display graphically the sensory data and optionally the documentary data and/or part thereof on the display unit(s) 140.

The sensors 120 may be deployed and/or integrated with one or more existing system and/or infrastructures already deployed in the airport and/or the runway. For example, the sensors 120 may be deployed in an electric power systems, an electric power infrastructure, a communication system and/or a communication infrastructure and/or the like that may already be available at the runway(s). This may reduce the deployment complexity, cost and/or effort for integrating the system 100 in the airport and runway(s).

The sensors 120 may be electrically connected to an existing electric power system and/or infrastructure to receive electric current (power). The sensors 120 may communicate with the central server 101 over one or more of the communication interfaces of the interface 102, for example, wireless communication interfaces such as, for example, WLAN, RF and/or the like. Additionally or alternatively, the sensors 120 may communicate with the aircraft landing classification unit 101 using one or more wired communication link such as, for example, Power Line Communication (PLC) over the electric power infrastructure such as, for example, copper Ethernet, fiber optic lines and/or the like.

Figure 2:
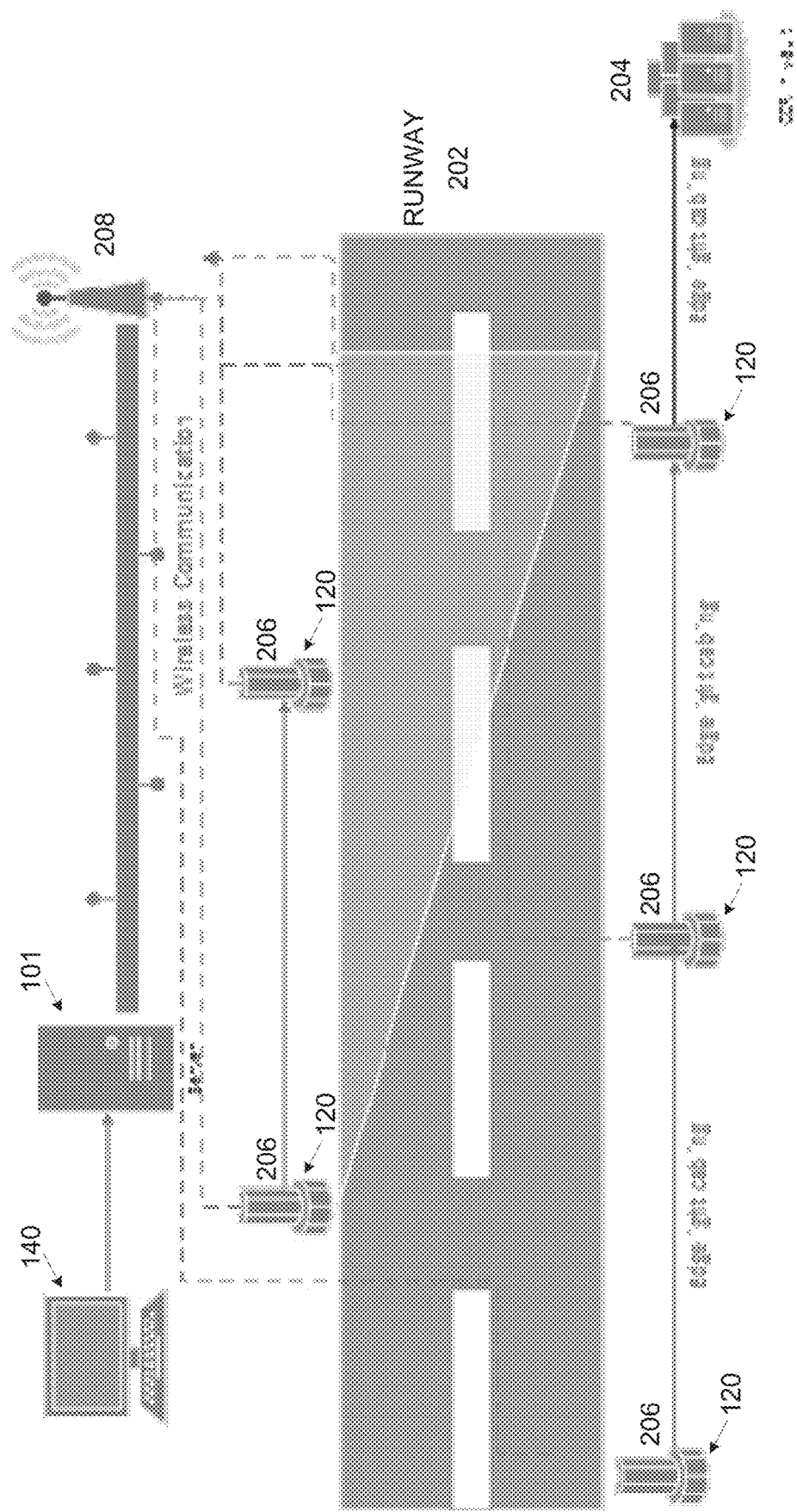
FIG. 2 is a schematic illustration of an exemplary embodiment of a system for automatically documenting and analyzing activity at a runway in an airport, according to some embodiments of the present invention.

Reference is now made to FIG. 2, which is a schematic illustration of an exemplary embodiment of a system for automatically documenting and analyzing activity at a runway in an airport, according to some embodiments of the present invention. An exemplary embodiment 200 of the system 100 for monitoring and analyzing activity at a runway 202 includes a central server such as the central server 101 and a plurality of sensors such as the sensors 120. The sensors 120 are deployed at the runway 202 such that each of the sensors 120 may monitor at least part of the runway 202. The sensors 120 may be electrically connected to an existing electric power system and/or infrastructure, for example, a runway lighting system 204 to receive electric current (power). The sensors 120 may communicate with the central server 101 over one or more of the communication interfaces of the interface 102, for example, wireless communication interfaces such as, for example, WLAN, RF and/or the like. The wireless communication between the sensors 120 and the central server 101 may be supported by one or more network devices 208, for example, a router, a switch, an access point, a range extender and/or the like. The network device(s) 208 may connect to the central server 101 over one or more wired and/or wireless networks connected to the interface 102.

Figure 3:
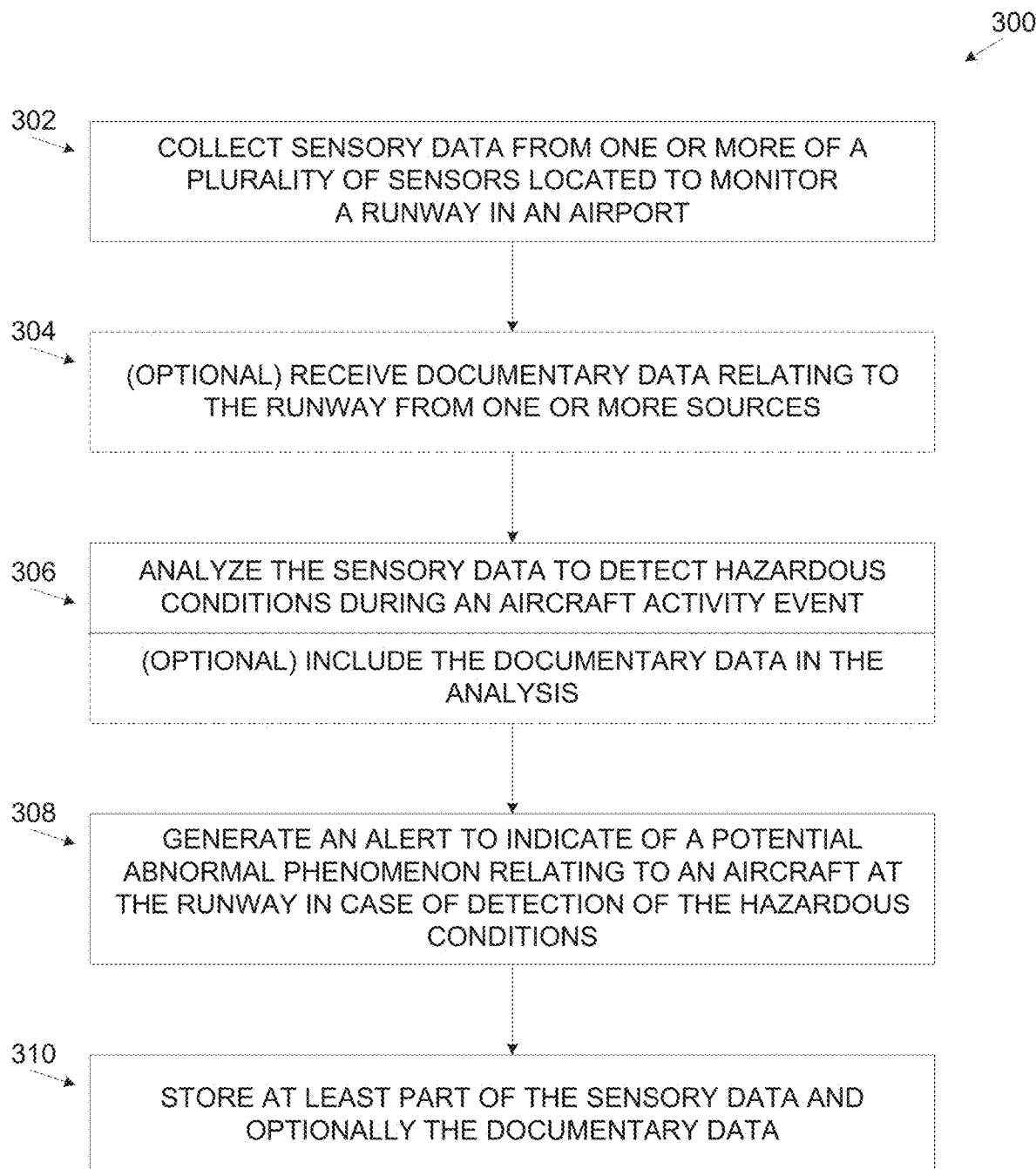
FIG. 3 is a flowchart of an exemplary process 300 for automatically documenting and analyzing aircraft activity at a runway to detect in real time hazardous conditions that may indicate of an abnormal phenomenon relating to an aircraft at the runway, according to some embodiments of the present invention.

Reference is now made to FIG. 3, which is a flowchart of an exemplary process 300 for automatically documenting and analyzing aircraft activity at a runway to detect in real time hazardous conditions that may indicate of an abnormal phenomenon relating to an aircraft at the runway, according to some embodiments of the present invention. The process 300 for automatically documenting and/or analyzing the aircraft activity event(s), for example, aircraft landing, aircraft touchdown, aircraft take-off and/or aircraft taxi at a runway such as the runway 202 may be executed by a central server such as the server 101 of a system such as the system 100. The process 300 may be executed by a real time analysis module such as the real time analysis module 110A.

As shown at 302, the process 300 starts with the real time analysis module 110A receiving and/or collecting sensory data, for example, image data, audio data, vibration data and/or weather data. The real time analysis module 110A may receive the sensory data from one or more of a plurality of sensors such as the image sensor 120A, the audio sensor 120B and/or the vibration sensor 120C deployed at the runway 202 in an airport.

Optionally, as shown at 304, the real time analysis module 110A receives documentary data such as the documentary data 130 from one or more supporting systems. The supporting systems may include, for example, a traffic control system, an airport control system, an airliner management system, a maintenance system, a runway control/monitoring system, a FOD system, a weather monitoring system, a weather website and/or the like. The documentary data 130 may include planned aircraft activity information at the runway 202. Based on the planned aircraft activity information, in preparation for one or more planned aircraft activities, the real time analysis module 110A may, for example, increase a sampling rate of one or more of the sensors 120 and/or bring online one or more of the sensors 120 which may be offline for energy saving and/or maintenance purposes.

Optionally, the real time analysis module 110A time tags one or more of the sensory data items constituting the sensory data to identify a timing of the captured data item. Optionally, one or more of the sensory data items are time tagged by the respective sensors 120 capturing the sensory data item(s). For example, a camera sensor 120A may time tag one or more images and/or a microphone 120B may time tag an audio signal. The time tagging may be done, for example, by a local controller available within one or more of the sensors 120.

As shown at 306, the real time analysis module 110A analyzes the sensory data to detect one or more hazardous conditions that may indicate one or more potential abnormal phenomena, abnormal aircraft activity and/or aircraft failure during one or more aircraft activity events at the runway 202. The hazardous conditions may include, for example, smoke and/or fire coming out of one or more of the aircraft engines, smoke and/or fire near one or more of the aircraft wheels and/or tires, a contact made between the aircraft body and/or part thereof, for example, tail, landing gear, hull, wing and/or the like with the runway 202 and/or with a foreign object in/on/near the runway 202.

The real time analysis module 110A may analyze the estimated location/position of the aircraft compared to the runway 202 to identify additional hazardous conditions, for example, the aircraft over-running the runway 202, the aircraft over-shooting the runway 202, the aircraft under-shooting the runway 202 and/or the aircraft missing the runway 202. The hazardous conditions may further include one or more non-typical patterns of the aircraft during the aircraft activity event.

The real time analysis module 110A may identify the aircraft non-typical patterns by analyzing the aircraft estimated movement/position/angle with respect to the runway 202. The non-typical patterns may include one or more non-typical movement patterns, for example, extreme tilting, stalling and/or rotating which may indicate a potential emergency condition. The non-typical patterns may also include one or more non-typical position patterns of the aircraft with respect to the runway and/or non-typical angle patterns of the aircraft with respect to the runway, for example, a runway miss, a runway overshot, a runway undershot, an extreme landing angle, an extreme take-off angle and/or the like.

The analysis executed by the real time analysis module 110A may include image processing of the imagery data received from the image sensor(s) 120A. The real time analysis module 110A may apply one or more trained classifiers (classification functions) to the captured images and/or video to detect the hazardous condition(s) during the aircraft activity event. The classifiers may be trained to detect, for example, the non-typical aircraft pattern(s), the smoke and/or fire next to the aircraft tire(s) and/or engine(s), the contact of the aircraft body part(s) with the runway and/or the like. The classifiers may be trained offline using a plurality of training sample patterns, for example, images, video clips and/or the like presenting, for example, aircraft take-offs, aircraft landing, aircraft touchdowns, aircraft taxiing, avionic incidents and/or the likes. The classifiers may also be trained with training sample patterns presenting the hazardous condition(s), for example, abnormal aircraft movements during take-off, landing, running and/or taxiing, smoke and/or fire in proximity to the aircraft wheel(s) and/or engine(s), contact of body part(s) of the aircraft with the runway 202 and/or the like. The classifiers may be further trained using training images captured for a plurality of aircraft types and/or under a plurality of weather and/or runway conditions.

The real time analysis module 110A may analyze additional sensory data received from the audio sensor(s) 120B and/or the vibration sensors 120C. The real time analysis module 110A may analyze audio data, for example, audio playback(s), sound, voice and/or the like received from the audio sensor(s) 120B. Similarly, the real time analysis module 110A may analyze vibration data, for example, vibration signal reading(s) received from the vibration sensor(s) 120C. The real time analysis module 110A may apply signal processing to the audio data to detect, for example, a take-off sound and/or a landing sound. The real time analysis module 110A may apply trained classifiers over the collected audio data to identify, for example, the aircraft take-off and/or touchdown sound. The classifiers may be trained offline with plurality of training sample patterns, for example, playbacks of aircraft take-off and/or touchdown events captured for a plurality of aircraft types and/or under a plurality of weather and/or runway conditions.

The real time analysis module 110A may also apply signal processing to the vibration data, for example, a vibration signal to detect a vibration signal pattern indicating an aircraft touching the surface of the runway 202 during landing and/or the aircraft running the runway 202 and lifting to the air. The real time analysis module 110A may apply trained classifiers over the collected vibration data to identify, for example, vibration patterns indicative of the aircraft take-off and/or touchdown vibrations. The classifiers may be trained offline with plurality of training sample patterns, for example, sensor readings of aircraft take-off and/or touchdown events captured for a plurality of aircraft types and/or under a plurality of weather and/or runway conditions.

The real time analysis module 110A may combine the results of the image processing and one or more of the signal processing to increase certainty of the hazardous condition(s) detection making it more robust. This may contribute to avoiding false positive detection, i.e. falsely indicating a potential aircraft abnormal behavior and/or aircraft failure while in reality there is no problem with the aircraft during the monitored and documented aircraft activity event.

Optionally, the real time analysis module 110A includes the documentary data 130 in the analysis of the sensory data received from the sensor(s) 120. The documentary data may be used to correlate between detected aircraft activity event(s) and planned aircraft activity event(s), for example, aircraft take-off, landing and/or taxiing received as log data in the documentary data 130. This may allow the real time analysis module 110A to better synchronize the actual aircraft activity events with the planned aircraft activity event(s) events. For example, the real time analysis module 110A may correlate suspected ice conditions detected on the runway 202 by analyzing, for example, images received from the image sensor(s) 120A with weather information received as part of the documentary data 130.

As shown at 308, in case the hazardous condition(s) is detected, the real time analysis module 110A presents, generates and/or transmits an alert to indicate of a potential aircraft abnormal behavior and/or aircraft failure. The alert may be provided to one or more users, for example, the traffic control personnel, the emergency team and/or the like. The alert may also be delivered to one or more automated systems, for example, the traffic control system, the maintenance system and/or the like.

As shown at 310, the real time analysis module 110A stores the sensory data and optionally the documentary data 130 and/or part thereof in storage such as the storage 106.

In some embodiments of the present invention, the collected and stored sensory data and optionally the documentary data 130 are provided to one or more users and/or systems, for example, a traffic controller, an aviation investigator and/or the like for post analysis. The stored data may be used for post analysis of one or more aircraft activity events captured by the sensor(s) 120 at the runway 202 and/or documented by the received documentary data 130. In the event an avionic incident took place during the aircraft activity event, for example, an accident, a near accident and/or an aerial incident, the post analysis may be applied to analyze the sequence of the avionic incident and/or to identify a root cause.

A post-event analysis module such as the post-event analysis module 110B may present post-event data comprising the sensory data and/or the documentary data 130 and/or part thereof collected and/or received during one or more aircraft activity events for post analysis. The post-event analysis module 110B may create the post-event data by synchronizing the sensory data items with the documentary data items using the time tags assigned to each of the data items (sensory and documentary). The post-event analysis module 110B may arrange the post-event data to display the collected sensory data items and/or documentary data items in a time-lined fashion to present the sequence throughout the entire aircraft activity event, i.e. before, during and following the aircraft activity event. The post-event analysis module 110B may present graphically the post-event data on one or more displays such as the displays 140. Optionally, the post-event analysis module 110B may transmit the post-event data to one or more remote network nodes, for example, a server, a system and/or a platform such that the post-event data may be available to one or more remote users and/or systems.

Figure 4:
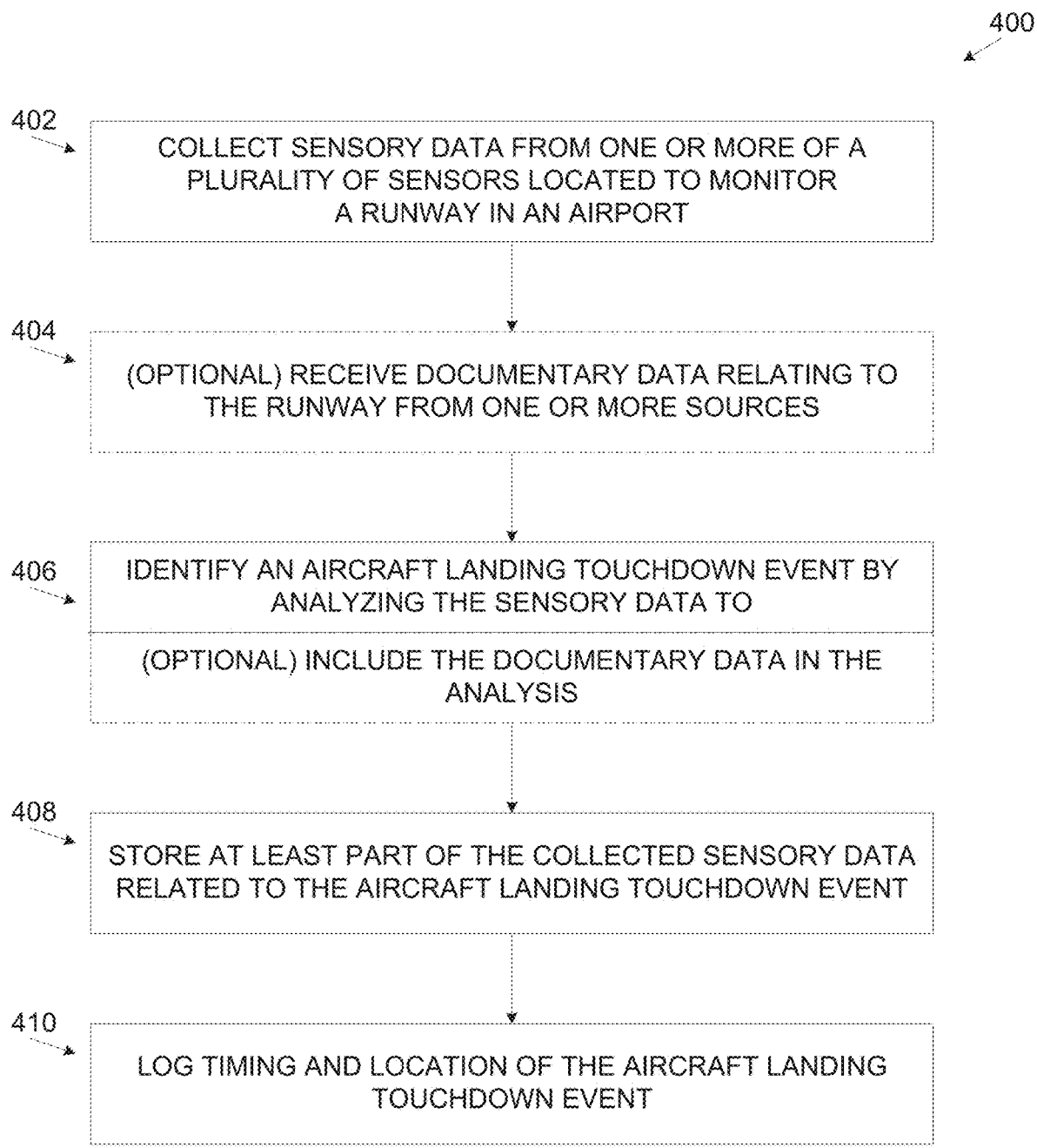
FIG. 4 is a flowchart of an exemplary process for automatically documenting and analyzing aircraft activity at a runway to detect timing and location of an aircraft landing touchdown event, according to some embodiments of the present invention.

Reference is now made to FIG. 4, which is a flowchart of an exemplary process 400 for automatically documenting and analyzing aircraft activity at a runway to detect timing and location of an aircraft landing touchdown event, according to some embodiments of the present invention. The process 400 for automatically documenting and/or analyzing aircraft activity at a runway to identify accurate timing and/or location of an aircraft touching a runway such as the runway 202 during a landing touchdown event may be executed by a central server such as the server 101 of a system such as the system 100. The process 400 may be executed by a real time analysis module such as the real time analysis module 110A.

As shown at 402, the process 400 starts with the real time analysis module 110A receiving and/or collecting the sensory data as described in step 302 of the process 300.

Optionally, as shown at 404, the real time analysis module 110A may receive documentary data such as the documentary data 130 as described in step 304 of the process 300.

As shown at 406, the real time analysis module 110A analyzes the sensory data to identify an accurate timing and location of the aircraft landing touchdown event. The analysis may include image processing of the imagery data received from the image sensor(s) 120A. The real time analysis module 110A may apply one or more trained classifiers (classification functions) to the captured images and/or video to identify the landing touchdown event. The classifiers may be trained offline using a plurality of training sets recorded on runways, for example, images, video clips and/or the like presenting the landing touchdown event, for example, images of aircraft landing, images of wheels touching down, smoke in the proximity of one or more wheels of the aircraft and/or location of the aircraft with respect to the runway 202 and/or the like. The classifiers may be further trained using training images captured for a plurality of aircraft types and/or under a plurality of weather and/or runway conditions. During the identified touchdown event, the real time analysis module 110A may detect by applying the trained classifiers, an exact timing and/or location when contact is made first between the aircraft wheels (landing gear) and the surface of the runway 202.

The analysis done by the real time analysis module 110A may also include signal processing of the audio data to identify, for example, a noise created by the aircraft touching the surface of the runway 202. The real time analysis module 110A may apply trained classifiers over the collected audio data to identify the touchdown event timing by detecting the aircraft touchdown sound. The classifiers may be trained offline as discussed before in step 306 of the process 300. The analysis done by the real time analysis module 110A may be further based on signal processing of the vibration data to identify, for example, a vibration signal pitch pattern indicating the aircraft touches the surface of the runway 202. The real time analysis module 110A may apply trained classifiers over the collected vibration data to identify the touchdown event timing and/or location by detecting vibration signal readings indicative of the aircraft touchdown. The classifiers may be trained offline as discussed before in step 306 of the process 300.

The real time analysis module 110A may combine the results of the image processing and one or more of the signal processing to increase an accuracy of the timing and/or location of the aircraft landing touchdown event.

The timing of the aircraft landing touchdown event is identified with an accuracy of 1 second. The location of the aircraft touchdown on the runway 202 during the aircraft landing touchdown event is identified with an accuracy of 10 meters.

Optionally, the real time analysis module 110A may correlate of the aircraft landing touchdown event timing with planned landing events that may be available in the received planned aircraft landing scheduling log data. The real time analysis module 110A may use the correlated data to improve the timing identification by analyzing the planned aircraft landing scheduling log data in conjunction with the sensory data and/or documentary data 130. The correlated timing may be further used to monitor and analyze traffic load and/or capacity of the runway 202.

The real time analysis module 110A may present and/or transmit the identified aircraft landing touchdown event timing and/or location to one or more users, for example, the traffic control personnel and/or the like. The alert may also be delivered to one or more systems, for example, the traffic control system, the maintenance system and/or the like.

Optionally, the real time analysis module 110A estimates an estimated taxiway exit for the aircraft to take in order to clear the runway 202 following the aircraft landing touchdown event. The real time analysis module 110A may estimate the estimated taxiway exit by calculating a landing distance of the aircraft from the point of touchdown (the point in which contact of the aircraft wheels make contact with the runway 202) to the point of where the aircraft gains taxiing speed. The real time analysis module 110A may use several variables for calculating the distance, for example, a weight of the aircraft, a speed of the aircraft while approaching the runway 202, a wind speed at the runway 202, a wind direction at the runway 202 and/or a friction of the runway 202 induced by one or more weather conditions.

The real time analysis module 110A may collect the variables used for the calculation from the sensory data and/or the documentary data. Optionally, the real time analysis module 110A may derive one or more of the variables from stored records indicating typical variables. For example, the real time analysis module 110A may extract the aircraft weight and/or the aircraft speed from known values according to the type of the aircraft as identified from the sensory data, for example, the image data. Additionally and/or alternatively, the type of the aircraft may be available from the documentary data 130. Other variable(s), for example, the friction of the runway 202 may be derived and/or simulated by the real time analysis module 110A according to the weather conditions available from, for example, the sensory data and/or the documentary data 130.

The real time analysis module 110A may transmit the estimated taxiway exit to one or more users and/or systems, for example, the traffic control person, the aircraft pilot, the traffic control system, the maintenance system and/or the like. This may allow directing automatically the aircraft pilot to exit in an estimated in advance taxiway exit such that the runway 202 may be cleared sooner thus increasing the utilization of the runway 202 and/or the taxiway(s) supporting the runway 202.

The real time analysis module 110A may also compare the estimated taxiway exit to a planned taxiway exit planned for the aircraft. The planned taxiway exit may be available to the real time analysis module 110A from the documentary data 130. The real time analysis module 110A may further alert the one or more of the users and/or systems of discrepancy(s) detected between the planned taxiway exit and the estimated taxiway exit estimated by the real time analysis module 110A. This may allow one or more of the alerted users and/or systems to take faster response to the discrepancy(s) and its consequence(s).

Optionally, by analyzing the sensory data, for example, the image data, the real time analysis module 110A may detect an actual taxiway exit taken by the aircraft to leave (clear) the runway 202 following the aircraft landing touchdown event. The real time analysis module 110A may transmit (alert) the actual taxiway exit to one or more of the users and/or systems. This may allow one or more of the alerted users and/or systems to take faster response to the availability conditions of the runway 202.

The real time analysis module 110A may also compare the actual taxiway exit to a planned taxiway exit planned for the aircraft. The planned taxiway exit may be available to the real time analysis module 110A from the documentary data 130. The real time analysis module 110A may further alert the one or more users and/or systems of discrepancy(s) detected between the planned taxiway exit and the actual taxiway exit taken by the aircraft as detected by the real time analysis module 110A. This may allow one or more of the alerted users and/or systems to take faster response to the discrepancy(s) and its consequence(s).

As shown at 408, the real time analysis module 110A stores the sensory data and optionally the documentary data 130 and/or part thereof in the storage 106.

As shown at 410, the real time analysis module 110A logs the identified timing and/or location of the aircraft landing touchdown event and may further store it in the storage 106.

The present invention, in some embodiments thereof, provides systems and methods for powering sensors using existing electric power systems and/or infrastructures available at an airport runway.

Figure 5:
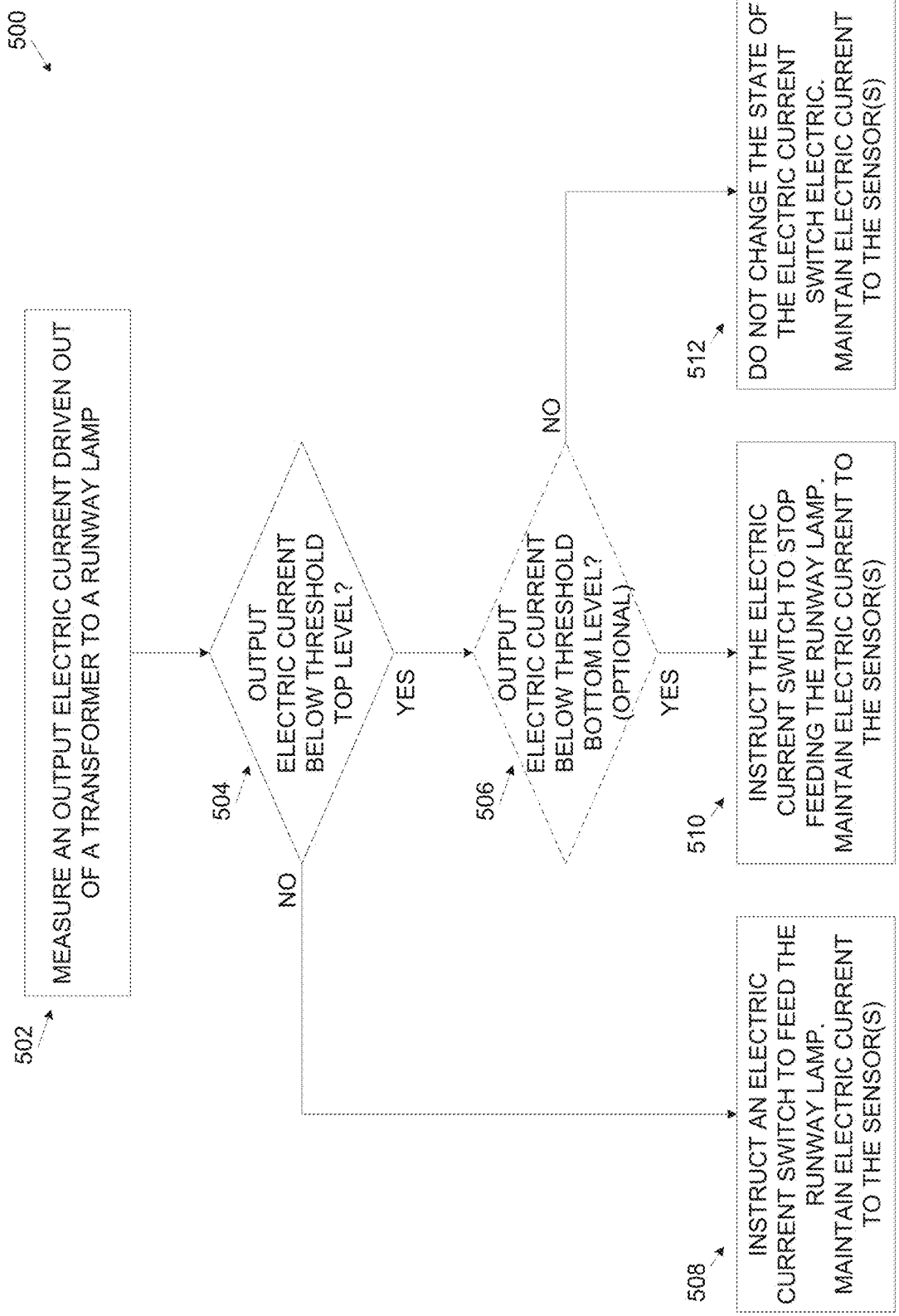
FIG. 5 is a flowchart of an exemplary process for controlling an electric current of a runway lamp while maintaining the electric current to sensor(s), according to some embodiments of the present invention.

Reference is now made to FIG. 5, which is a flowchart of an exemplary process for controlling an electric current of a runway lamp while maintaining the electric current to sensor(s), according to some embodiments of the present invention. A process 500 for controlling an electric current feed to one or more runway lamps is applied to take advantage of an existing airport runway lighting power system for powering one or more sensors deployed along the airport runway.

Figure 6:
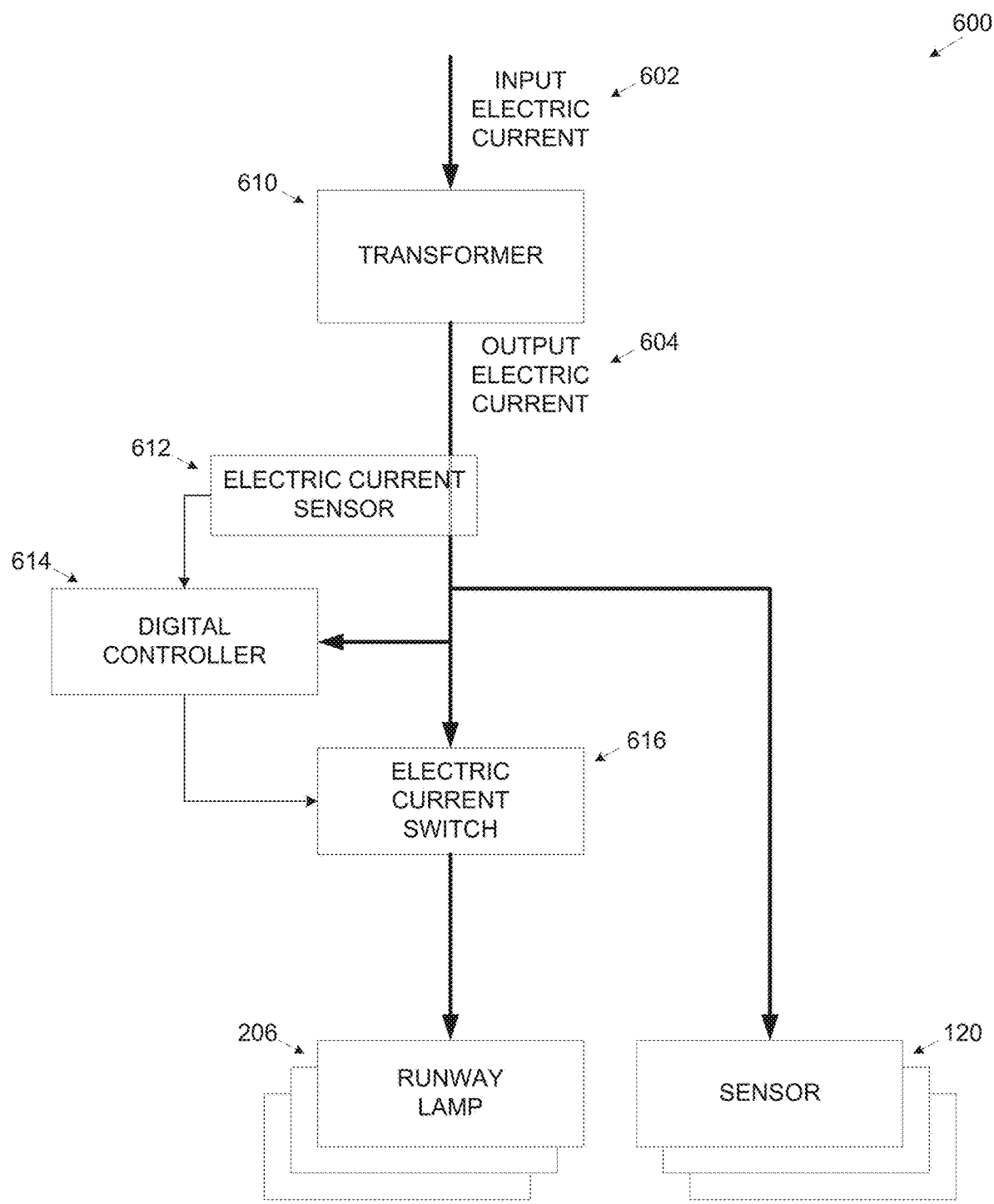
FIG. 6 is a schematic illustration of an exemplary system for controlling an electric current of a runway lamp while maintaining the electric current to sensor(s), according to some embodiments of the present invention.

Reference is now made to FIG. 6, which is a schematic illustration of an exemplary system for controlling an electric current of a runway lamp while maintaining the electric current to sensor(s), according to some embodiments of the present invention. A system 600 includes a transformer 610, for example, a CCR that is powered by an input electric current 602 driven by an existing electrical power systems and/or infrastructures available at a runway in an airport, for example, a runway lighting system and/or infrastructure such as the runway lighting system 204.

The runway lighting system 204 may feed one or more runway lamps 620 with the electric current 602. One or more sensors 120 such as the sensors 120A, 120B and/or 120C may be electrically attached to the transformer 610 in order to receive the electric current 602 required for the sensor(s) 120 operation. However, while the runway lamp(s) 206 may need to be turned ON/OFF according to instructions received, for example, from a runway control system, the sensor(s) 120 must be constantly powered. The runway lamp(s) 206 may need to be turned ON/OFF or be driven with different current levels according to light conditions at the runway affected by, for example, night, day, dusk, fog and/or the like.

The system 600 includes an electric current sensor 612, a digital controller 614 and an electric current switch 616 for feeding an electric current 604 coming in from the transformer 610 to the runway lamp(s) 206. The digital controller 614 is adapted to instruct the electric current switch 616 to feed or stop the output electric current 604 to the runway lamp(s) 206 according to a current level measured by the electric current sensor 612. The current sensor 612 is placed to continuously measure the level of the output electric current 604 and provide the electric current readings to the digital controller 614. The electric current switch 616 is located between the transformer 610 and the runway lamp(s) 206 so that the electric current switch 616 may feed or stop the electric current 604 to the runway lamp(s) 206.

The digital controller 614 may be utilized by, for example, one or more electrical circuits for controlling the operation of the current switch 616. The digital controller 614 may also be utilized through one or more microcontroller and/or processors coupled with a non-transitory storage medium storing a control program code to execute the control program code for controlling the current switch 616. The electric current switch 616 may be implemented by an electronic switch such as, for example, a solid-state device and/or the like. Optionally, the electric current switch 616 is implemented by an electromechanical switch such as, for example, a relay that physically breaks the current path of the output electric current 604 to the runway lamp(s) 206. The sensor(s) 120 may be electrically attached to the transformer 610 such that the sensor(s) 120 are continuously driven with the output electric current 604 directly from the transformer 610. Optionally, the sensor(s) 120 receive their electric current through an additional transformer rather than from the transformer 610 of the runway lamp(s) 206.

Figure 7:
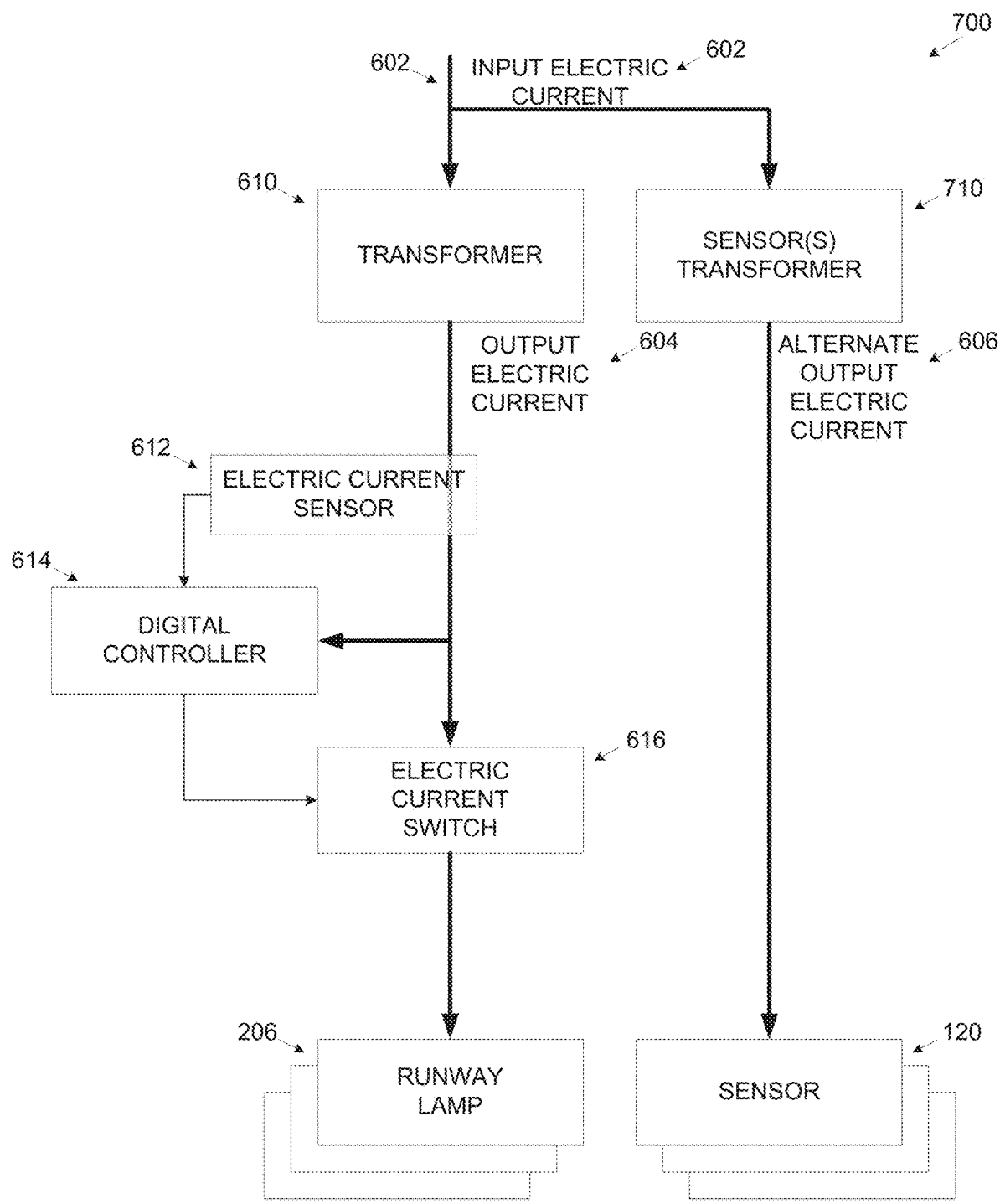
FIG. 7 is a schematic illustration of an exemplary system for controlling an electric current of a runway lamp while maintaining the electric current to sensor(s) through a separate transformer, according to some embodiments of the present invention.

Reference is also made to FIG. 7, which is a schematic illustration of an exemplary system for controlling an electric current of a runway lamp while maintaining the electric current to sensor(s) through a separate transformer, according to some embodiments of the present invention. A system 700 may comprise the components of the system 600 such as the electric current sensor 612, the digital controller 614 and the electric current switch 616. The system 700 further comprises an additional transformer 710 that receives the input electric current 602 from the runway lighting system 204 and continuously provides an alternate output electric current 606 to the sensor(s) 120.

Optionally, the electric current sensor 612 is integrated in the electric current switch 616.

Optionally, the digital controller 614 is integrated in the electric current switch 616.

Reference is made once again to FIG. 5. The process 500 for controlling the electric current of runway lamp(s) while maintaining the electric current to one or more sensors may be implemented using a system such as the system 600 and/or the system 700. The process 500 is applied to control an electric current such as the electric current 604 to one or more runway lamps such as the runway lamp 206. The process 500 does not affect the electric current that is constantly driven to one or more sensors such as the sensors 120.

As shown at 502, an electric current sensor such as the electric current sensor 612 constantly measures a level of the output electric current 604 driven from a transformer such as the transformer 610 to power the runway lamp(s) 206. The electric current sensor 612 may transmit and/or provide the measured level of the output electric current 604 to a controller such as the digital controller 614.

As shown at 504 which is a decision point, in case the measured level of the output electric current 604 is above a pre-defined threshold value the controller 614 branches to 508. In case the measured level of the output electric current 604 is below the pre-defined threshold value the controller branches to 510. Optionally, a hysteresis mechanism is implemented by the digital controller 614 to prevent intermittent operation of the system 600 and/or 700 as result of fluctuations in the output electric current 604. The hysteresis mechanism predefines two threshold values—a threshold top level and a threshold bottom level. In case the digital controller 614 employs the hysteresis mechanism and the measured level of the output electric current 604 is above the predefined threshold top level, the controller branches to 508. In case the digital controller 614 employs the hysteresis mechanism and the measured level of the output electric current 604 is below the predefined threshold top level, the digital controller 614 branches to 506.

The runway lighting system may completely remove the input electric current 602 when the runway lamps are turned OFF or the runway lighting system may reduce the level of the input electric current 602 to be below the pre-determined threshold, such that the runway lamp(s) are turned OFF by the electric current switch. The runway lighting system, for example, a current regulator, may be adjusted to drive the input electric current 602 at the reduced current level that is below the lowest operational current level, for example, 2.7 A instead of completely removing the input electric current 602. In case the runway lighting system drives the input electric current at the reduced current level, the reduced current level, for example, 2.7 A may be used as the threshold level. In case the digital controller 614 implements the hysteresis mechanism, the threshold top level may be predefined to 2.7 A and the threshold bottom level may be predefined to 2.6 A.

As shown at 506 which is an optional decision point, in case the measured level of the output electric current 604 is below the predefined threshold bottom level value, the digital controller 614 branches to 510. In case the measured level of the output electric current 604 is above the pre-defined threshold bottom level value, the digital controller 614 branches to 508.

As shown at 508, the digital controller 614 instructs electric current switch to feed the output electric current 604 to the runway lamp(s) 206.

As shown at 510, the digital controller 614 takes no action since the measured level of the output electric current is within the hysteresis region.

The sensor(s) 120 are continuously driven with an electric current, either the output electric current 604 in the system 600 or the alternate output electric current 606 in the system 700 with no regard to the state of the electric current switch 616.

The process 500 is continuously applied to the output electric current 604 such that the digital controller 614 may immediately respond to any change in the current level of the output electric current 604 to take an appropriate action.

Figure 8:
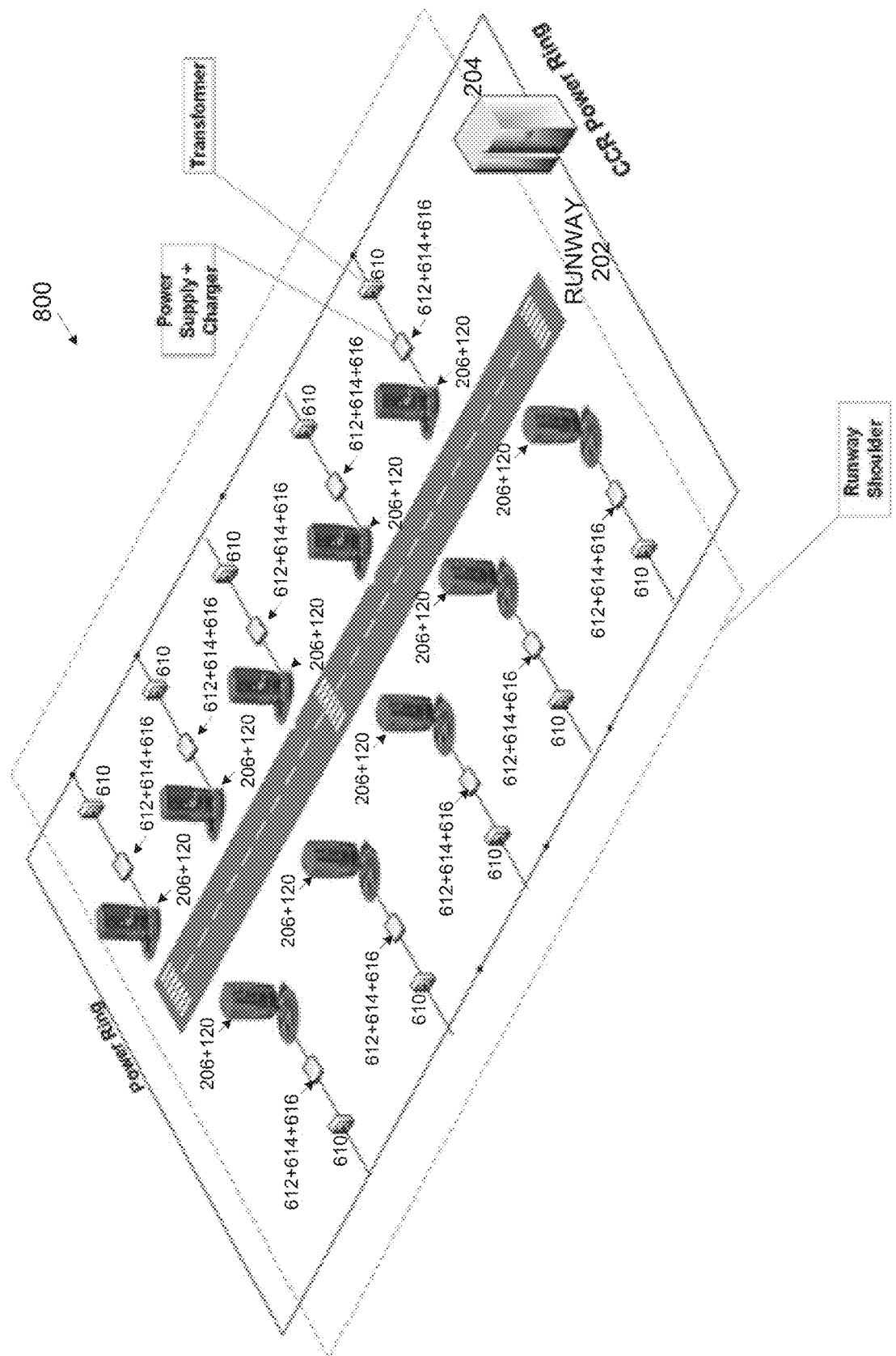
FIG. 8 is a schematic illustration of an exemplary system deployed at an airport runway for controlling an electric current of runway lamps while maintaining the electric current to sensors, according to some embodiments of the present invention.

Reference is now made to FIG. 8, which is a schematic illustration of an exemplary system deployed at an airport runway for controlling an electric current of runway lamps while maintaining the electric current to sensors, according to some embodiments of the present invention. A system 800 such as the system 600 is deployed at an airport runway such as the runway 202. A plurality of sensors such as the sensors 120A, 120B and/or 120C are deployed using an existing runway lighting system such as the runway lighting system 204 that drives an electric current to a plurality of runway lamps 206. Each of the lamps 206 is connected through a transformer such as the transformer 610 to the power-line coming in from the runway lighting system 204 to receive an input electric current such as the electric current 602.

An electric current such as the output electric current 604 is driven out of each of the transformers 610. At each extension of the power-line, each going to one of the runway lamps 206 an electric current sensor such as the current sensor 612 constantly measures the current level of the output electric current 604. The sensor 612 provides the measured current level to a respective controller such as the digital controller 614 that instructs an electric current switch such as the electric current switch 616 to feed or to stop feeding the output electric current to the respective runway lamp 206. While the output electric current 604 is fed to the runway lamp(s) 206 according to the measured current level of the output electric current, the sensor(s) 120 are constantly driven with the output electric current 604 to allow continuous operation of the sensor(s) 120.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors will be developed and the scope of the term sensors is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for powering a sensor from an electric current line of a runway lamp, comprising:
    an electric current sensor located to measure a continuous output electric current driven out of a transformer of a runway lamp, said transformer is electrically connected to an electric current line of a runway to receive a continuous input electric current from said electric current line;
    at least one of a plurality of sensors driven by said continuous output electric current;
    an electric current switch adapted to control feeding of said continuous output electric current to said runway lamp; and
    a digital controller adapted to instruct said electric current switch to stop feeding said continuous output electric current to said runway lamp when an output of said electric current sensor indicates that said measured continuous output electric current is below a predefined threshold;
    wherein a feed of said sensor electric current is not affected by said instruction such that said at least one sensor is continuously driven by said output electric current, and
    wherein said feeding of said continuous output electric current to said runway lamp is maintained while said continuous output electric current is above said predefined threshold.

2. The system of claim 1, wherein said continuous electric current driven to said at least one sensor is driven out of said transformer.

3. The system of claim 1, wherein said continuous electric current driven to said at least one sensor is driven out of at least one other transformer electrically connected to said electric current line in parallel to said transformer.

4. The system of claim 1, wherein said electric current switch is an electronic switch.

5. The system of claim 1, wherein said electric current switch is an electro-mechanical switch.

6. The system of claim 1, further comprising said digital controller applies hysteresis to said predefined threshold such that said instruction is not issued before said continuous output electric current drops below a pre-defined bottom threshold level.

7. A method of powering a sensor with an electric current of a runway lamp, comprising:
    measuring a continuous output electric current driven out of a transformer of a runway lamp, said transformer is electrically connected to an electric current line of a runway to receive continuously an input electric current from said electric current line;
    powering continuously at least one of a plurality of sensors using said continuous output electric current; and
    instructing an electric current switch to stop feeding said continuous output electric current to said runway lamp when said measured continuous output electric current is below a predefined threshold;

wherein a feed of said electric current to said at least one sensor is not affected by said instruction such that said at least one sensor is continuously driven by said output electric current, and wherein said feeding of said continuous output electric current to said runway lamp is maintained while said continuous output electric current is above said predefined threshold.

\* \* \* \* \*